(12) United States Patent
Asano (10) Patent No.: US 7,852,939 B2
(45) Date of Patent: Dec. 14, 2010

(54) MOTION VECTOR DETECTION METHOD AND DEVICE OF THE SAME

(75) Inventor: Wataru Asano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1457 days.

(21) Appl. No.: 11/252,244

(22) Filed: Oct. 18, 2005

(65) Prior Publication Data
US 2007/0086525 A1 Apr. 19, 2007

(30) Foreign Application Priority Data
Oct. 18, 2004 (JP) .............................. 2004-303405

(51) Int. Cl.
*H04N 7/12* (2006.01)
*H04N 11/02* (2006.01)
(52) U.S. Cl. ................................. 375/240.16
(58) Field of Classification Search ............. None
See application file for complete search history.

(56) References Cited

U.S. PATENT DOCUMENTS

| | | | | |
|---|---|---|---|---|
| 6,014,181 A * | 1/2000 | Sun | ............................ | 348/699 |
| 6,195,389 B1 * | 2/2001 | Rodriguez et al. | ..... | 375/240.16 |
| 6,842,483 B1 * | 1/2005 | Au et al. | ................ | 375/240.16 |
| 6,876,703 B2 * | 4/2005 | Ismaeil et al. | .......... | 375/240.16 |
| 6,891,891 B2 * | 5/2005 | Pau et al. | ................ | 375/240.16 |
| 7,145,950 B2 * | 12/2006 | Hsu et al. | .............. | 375/240.16 |
| 7,236,527 B2 * | 6/2007 | Ohira | .................... | 375/240.16 |
| 2003/0161400 A1 * | 8/2003 | Dinerstein et al. | ..... | 375/240.16 |

FOREIGN PATENT DOCUMENTS

JP 2004-129099 4/2004

OTHER PUBLICATIONS

Zhu et al., "A new Diamond Search Algorithm for Fast Block-Matching Motion Estimation", IEEE Transactions on Image Processing, vol. 9, No. 2, Feb. 2000, pp. 287-290.

\* cited by examiner

*Primary Examiner*—Yuzhen Ge
(74) *Attorney, Agent, or Firm*—Nixon & Vanderhye, PC (57) ABSTRACT

When a search is made for a motion vector of a moving image, a motion vector search desirable against a hard movement is devised to be made with a small processing amount, and a motion vector detection device includes a wide range motion vector search part, a narrow range motion vector search part, a motion vector prediction part, and a motion vector re-search part. A rough search is made at equal intervals on an inputted image while a corresponding position in the reference image is made the center; a fine search is made in the vicinity of a predicted value of the motion vector only at one stage in accordance with a search format of a gradient method; and from a result of both, motion vector detection is performed as a motion vector search start point by the gradient method.

10 Claims, 10 Drawing Sheets

Fig 11

MOTION VECTOR DETECTION METHOD AND DEVICE OF THE SAME

CROSS-REFERENCE TO RELATED APPLICATIONS

This application is based upon and claims the benefit of priority from the prior Japanese Patent Application No. 2004-303405, filed on Oct. 18, 2004; the entire contents of which are incorporated herein by reference.

TECHNICAL FIELD

The present invention relates to a motion vector detection method associated with moving image coding and a device of the same.

BACKGROUND OF THE INVENTION

In an international standard of a moving image coding system such as MPEG-2, MPEG-4 or H.264, a motion vector indicating that a block to be coded resembles which position of a reference image is used. When the motion vector is proper, an error between the block and the reference image becomes small, and efficient coding becomes possible. On the other hand, when the motion vector is improper, an error becomes large, and coding efficiency is lowered. As stated above, the accuracy of the motion vector has a large influence on the coding efficiency.

Since motion vector search generally requires a large amount of operation, efficient motion vector search methods have been proposed. As examples of the high speed movement search methods, a hierarchical search method (see, for example, JP-A-2004-129099) and a search by a gradient method (see, for example, Shan Zhu and Kai-Kuang Ma, "A New Diamond Search Algorithm for Fast Block-Matching Motion Estimation", IEEE TRANSACTIONS ON IMAGE PROCESSING, VOL. 9, NO. 2, FEBRUARY 2000) are named.

However, in the hierarchical search method, there is a problem that when a search range is widened, the number of search points is increased in proportion thereto.

On the other hand, in the gradient method, search points are compared, and a search is made while a shift is performed in the direction in which an evaluation value is good, and therefore, the number of search points may be small. However, in the gradient method, there is a problem that in the case where motion from the reference image is hard, an accurate motion vector can not be obtained.

Then, the present invention has been made in view of the above, and has an object to provide a motion vector search method, device and program, in which when a search is made for a motion vector, the accurate motion vector can be obtained, while an increase in processing amount and the like is suppressed.

BRIEF SUMMARY OF THE INVENTION

According to embodiments of the present invention, a motion vector detection method for detecting a motion vector by comparing a detection object image, which is one image in a moving picture and is subjected to the detecting of the motion vector, with a reference image that is another image in the moving picture at a time different from the detection object image, includes:

dividing the detection object image into plural blocks; and processing each block thus divided, and said processing of each block including, (1) searching for the motion vector at intervals of "n" pixels in a wide search range that has "a" pixels, or pixels as many as "a", and is centered at a wide range search center point, which point is in the reference image at a position matching one block in the detection object image, so as to obtain a wide range search evaluation value;

(2) predicting a predicted motion vector from a past motion vector and searching for the motion vector at intervals of "m" pixels (n>m>=1) in a narrow search range having "b" pixels (a>b>1) that is centered at a narrow range search center point, which point means a position of the predicted motion vector in the reference image, as to obtain a narrow range search evaluation value;

(3) comparing the wide range search evaluation value and the narrow range search evaluation value, and determining, from a result of the comparing, a position corresponding to a high search evaluation value to be a re-search center point of the motion vector; and (4) detecting the motion vector by re-searching for the motion vector in a re-search range having "c" pixels (a>c>=b) that is centered at the re-search center point.

According to embodiments of the present invention, there is obtained an effect that when a search is made for a motion vector, the accurate motion vector can be obtained, while an increase in processing amount and the like is suppressed.

DETAILED DESCRIPTION OF THE INVENTION

Hereinafter, an embodiment of a motion vector detection device of the present invention will be described in detail with reference to the drawings.

(1) Structure of Moving Image Coding Device 100

Figure 1:
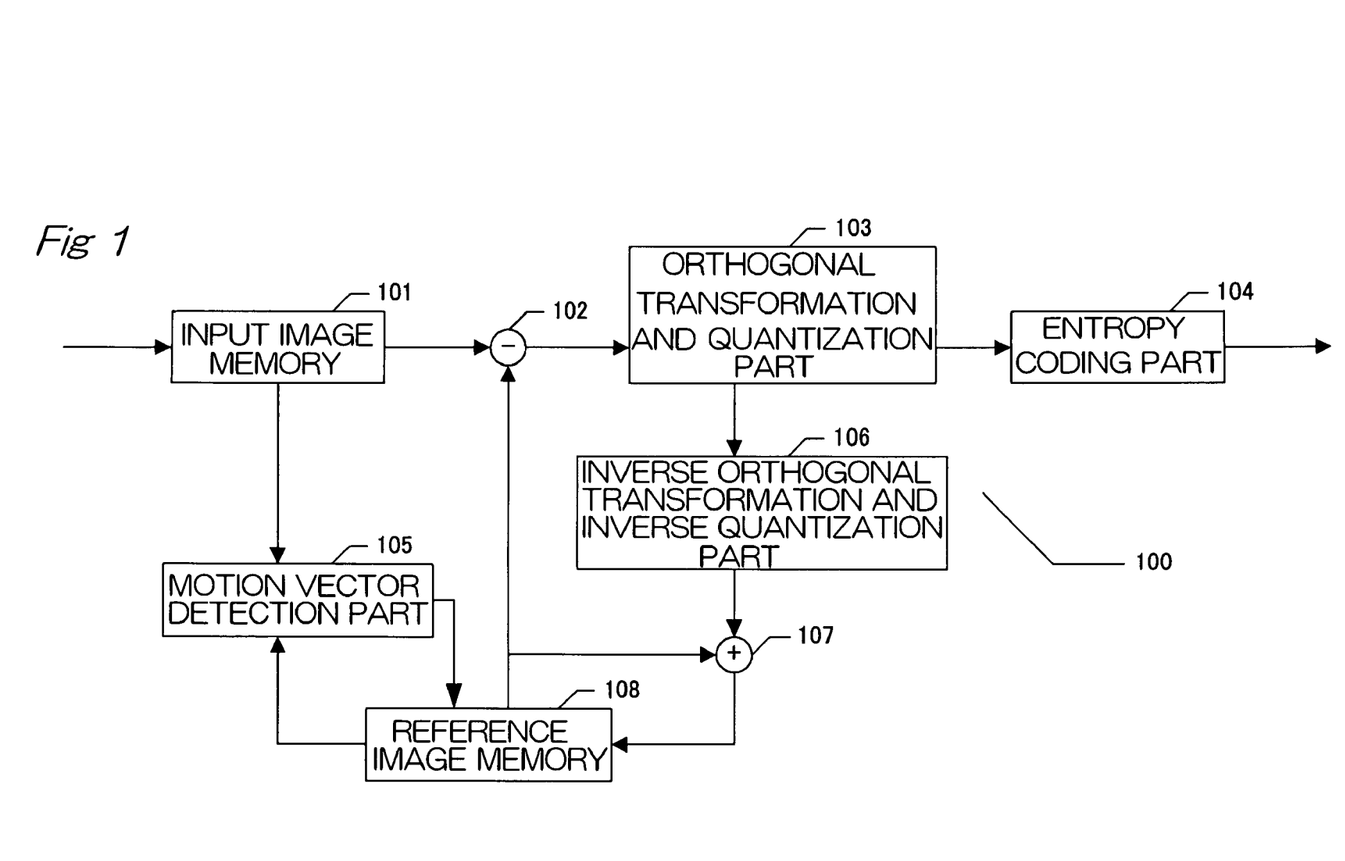
FIG. 1 is a block diagram showing a structure of a moving image coding device including a motion vector detection device according to an embodiment of the invention.

FIG. 1 is a block diagram showing a structure of a moving image coding device 100 including a motion vector detection device 105 of this embodiment.

As shown in FIG. 1, the moving image coding device 100 includes an input image memory 101, a difference operation part 102, an orthogonal transformation and quantization part 103, an entropy coding part 104, a motion vector detection part 105, an inverse orthogonal transformation and inverse quantization part 106, an addition operation part 107, and a reference image memory 108.

The input image memory 101 stores an image signal which is inputted and becomes a coding object.

The motion vector detection part 105 uses a decoded image signal, which was already coded, as a reference image, and detects a motion vector indicating a position which is predicted to be most suitable in a specified search range.

The difference operation part 102 obtains a difference between the image signal from the input image memory 101 and the decoded image signal, from the reference image memory 108, of the position indicated by the motion vector obtained in the motion vector detection part 105 and generates a predicted error signal.

The orthogonal transformation and quantization part 103 performs an orthogonal transformation on the inputted predicted error signal and quantizes its transformation coefficient.

The entropy coding part 104 performs entropy coding of the inputted transformation coefficient, motion vector information and the like, and generates a code string.

The inverse orthogonal transformation and inverse quantization part 106 inversely quantizes the transformation coefficient quantized by the orthogonal transformation and quantization part 101, decodes the transformation coefficient, performs the inverse orthogonal transformation processing on the decoded transformation coefficient, and decodes the predicted error signal.

The addition operation part 107 adds the decoded predicted error signal and the reference image signal, and generates a decoded image signal.

The reference image memory 108 stores the generated decoded image signal.

(2) Structure of the Motion Vector Detection Device 105

Figure 2:
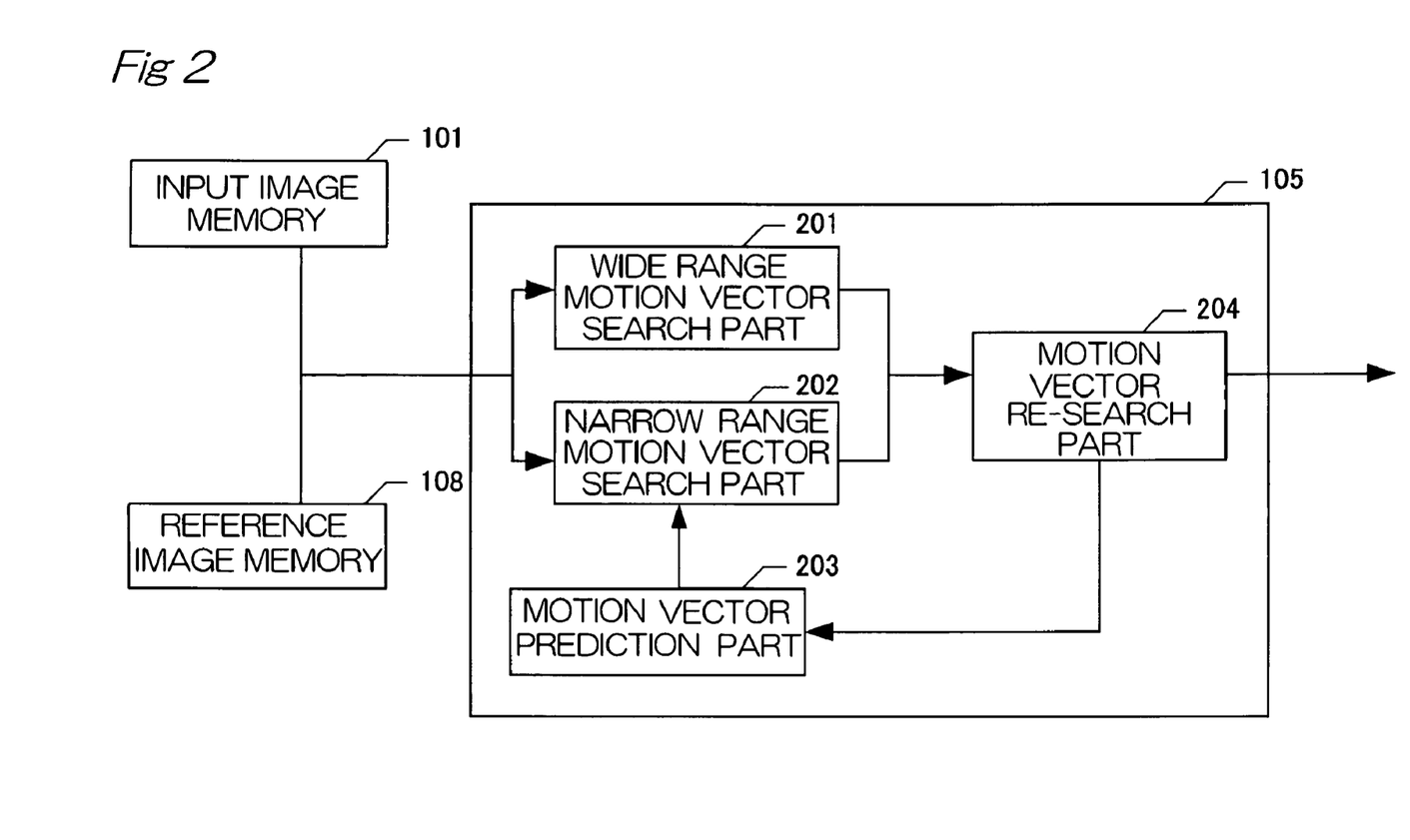
FIG. 2 is a block diagram showing a structure of the motion vector detection device according to the embodiment of the invention.

The motion vector detection device 105 will be described. FIG. 2 is a block diagram showing a structure of the motion vector detection device of this embodiment.

As shown in FIG. 2, the motion vector detection device 105 includes a wide range motion vector search part 201, a narrow range motion vector search part 202, a motion vector prediction part 203, and a motion vector re-search part 204.

The wide range motion vector search part 201 receives image data of a block as a detection object of a motion vector from the input image memory 101, and next receives image data of a motion vector search range from the reference image memory 108. Then, a rough search is made in the search range of the motion vector based on both the image data.

The narrow range motion vector search part 202 receives the image data of the block as the object from the input image memory 101, and next receives the image data of the motion vector search range from the reference image memory 108. Then, a fine search is made in the vicinity of a motion vector given from the motion vector prediction part 203.

The motion vector prediction part 203 uses peripheral motion vectors and predicts the motion vector as the object.

The motion vector re-search part 204 compares two motion vectors obtained by the wide range motion vector search part 201 and the narrow range motion vector search part 202 by a specified method, re-searches for a motion vector in the vicinity of the motion vector having a good evaluation value, and determines a final motion vector.

(3) First Motion Vector Detection Method

Figure 3:
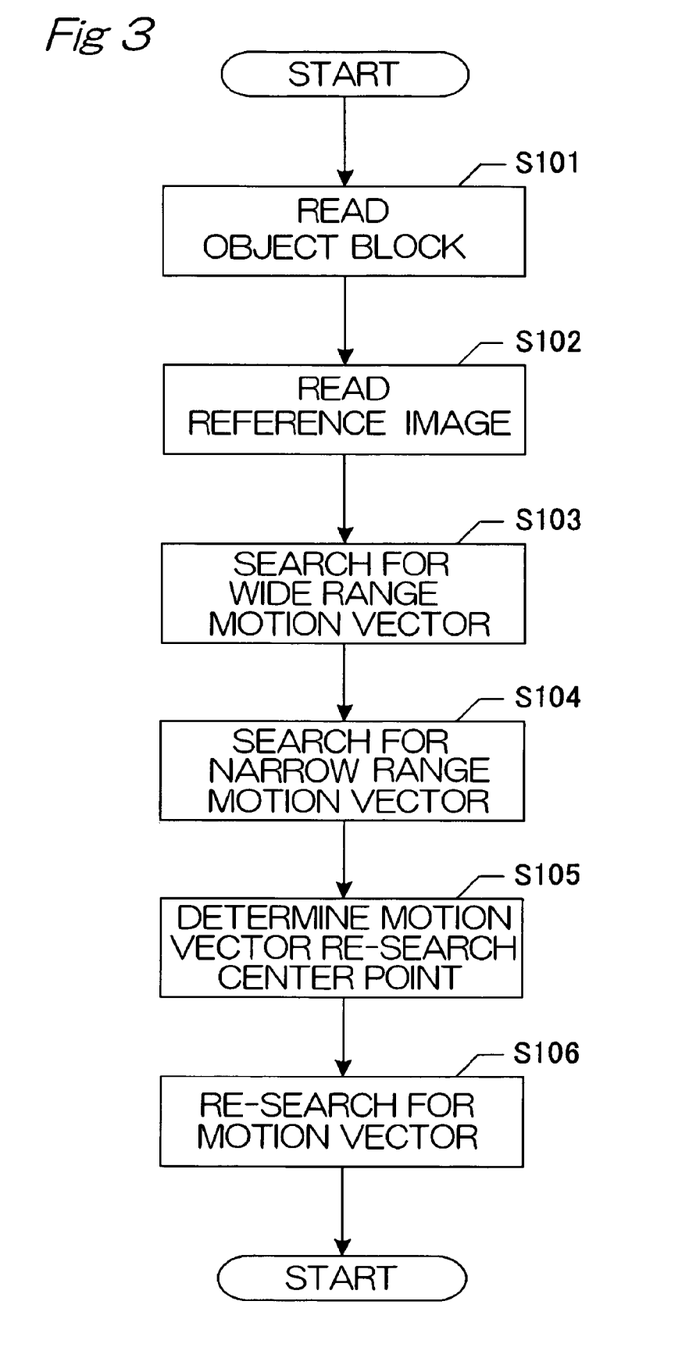
FIG. 3 is a flowchart showing a procedure of a motion vector detection method carried out by the motion vector detection device.

A first motion vector detection method will be described with reference to FIG. 3, while a case where it is carried out by the motion vector detection device 105 is used as an example.

First, an object block is read from the input image memory 101 (step S101), and a reference image is read from the reference image memory 108 (step S102).

Next, the wide range motion vector search part 201 roughly searches for a motion vector (step 103). Specifically, when a motion vector search range in the horizontal direction is ±x pixels, and a search range in the vertical direction is ±y pixels, a search is made every "n" pixels while (0, 0) is made the center. That is, a search of points of (i*n, j*n) is made. Here, i and j denote integers, and satisfy a relation of $-x \leq i*n \leq x$ and $-y \leq j*n \leq y$.

Figure 4:
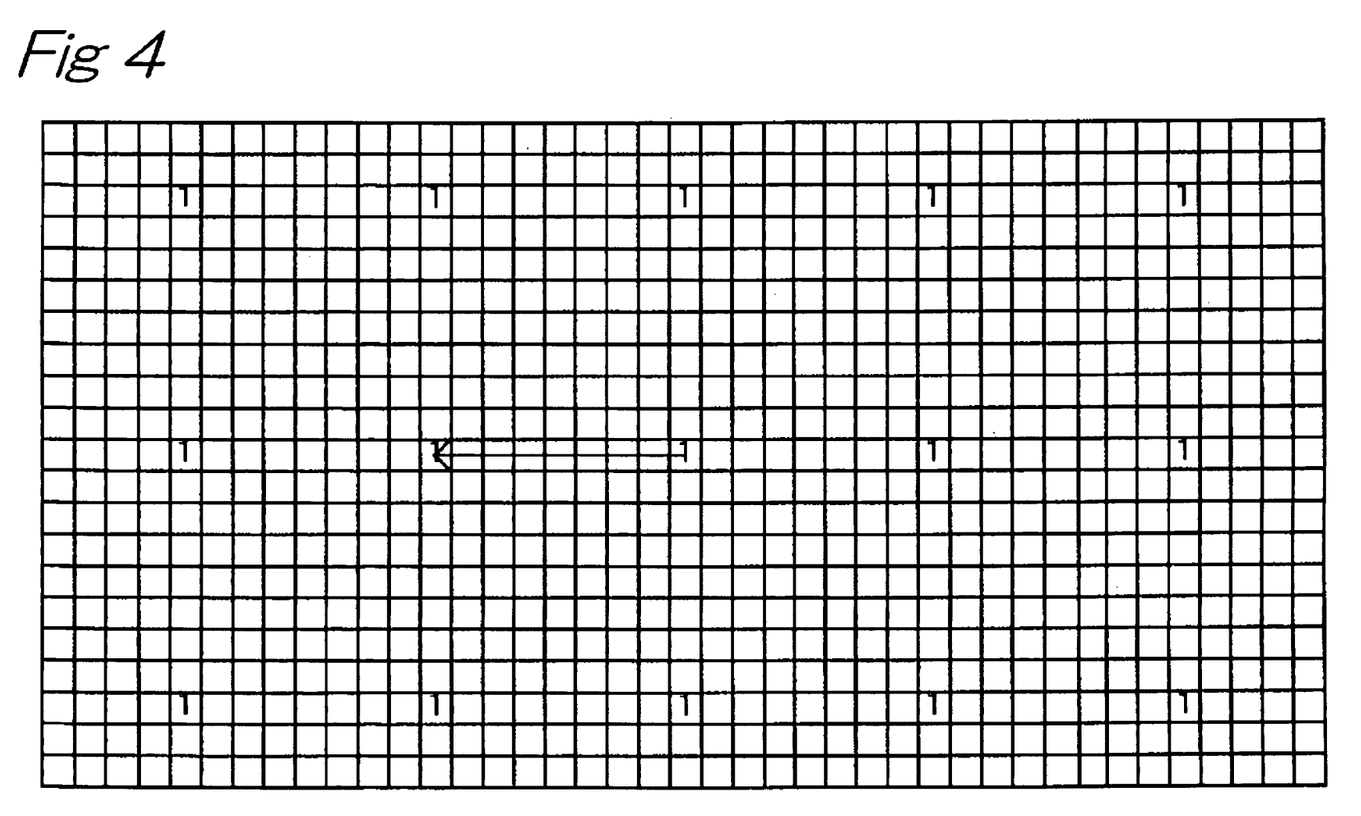
FIG. 4 is a view showing points which a wide range motion vector search part searches.

For example, in the case where the horizontal direction search range is ±20, the vertical direction search range is ±10, and the search interval is n=8, a search of in total 15 points of (0, ±8), (±8, ±8), (±16, ±8), (0, 0), (±8, 0) and (±16, 0) is made (see FIG. 4). Here, "1" in FIG. 4 denotes a search point, and a solid line denotes a detected motion vector. When the search range x and y is widened, the number of search points is generally increased, however, when n is set to be large, even if the search range is widened, an increase of the number of search points can be prevented. Although this wide range search is excellent in that a large movement is easy to pursue, it has trouble in accurately pursuing a small movement.

Next, the narrow range motion vector search part 202 finely searches the vicinity of the predicted value of the motion vector (step S104). For example, first, the motion vector prediction part 203 predicts a motion vector from a peripheral block by a method determined in a moving image coding system (MPEG-2, MPEG-4, H.264, etc.) in which coding is to be performed.

Figure 5:
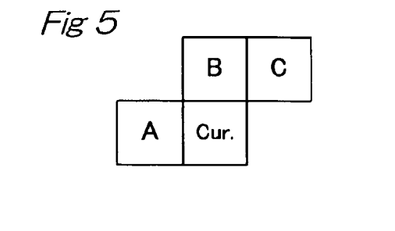
FIG. 5 is a view for explaining motion vector prediction in H.264.

For example, in the case of H.264, as shown in FIG. 5, an intermediate value of motion vectors in a left block A of a current block, an upper block B and an upper right block C is made a predicted motion vector.

Figure 6:
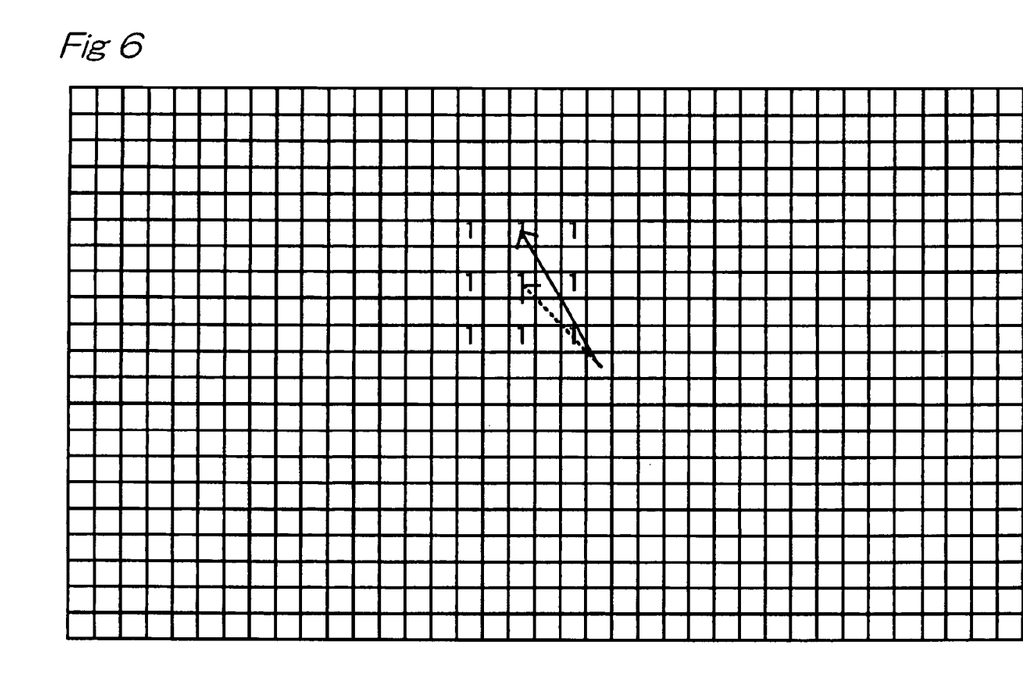
FIG. 6 is a view showing points which a narrow range motion vector search part searches.

The narrow range motion vector search part 202 searches positions of ±"m" pixels, while the predicted motion vector (Px, Py) obtained in this way is made the center. Here, m denotes an integer smaller than n. That is, a search of in total 9 points of (Px, Py), (Px±m, Py), (Px, Py±m), (Px±m, Py±m) is made (see FIG. 6). Here, a dotted line of FIG. 6 denotes a predicted motion vector, "1" denotes a search point, and a solid line denotes a detected motion vector. The narrow range search is very excellent in the case where a movement is small and prediction easily comes true, however, in the case where the movement is large and random, there is a defect that a search of a place far removed from an actual movement is made.

Next, the motion vector re-search part 204 determines a motion vector re-search center point (step S105). Specifically, evaluation values of two motion vectors obtained by the wide range motion vector search and the narrow range motion vector search are compared, and a better one is selected. The evaluation value is, for example, a sum of absolute difference (SAD), a sum of square difference (SSD) or the like. Alternatively, what is obtained by weight-adding the magnitudes of the motion vectors to these may be adopted. In the case where the evaluation value is the sum of absolute difference, the wide range motion vector search result or the narrow range motion vector search result in which the sum of absolute difference is smaller is selected.

Figure 7:
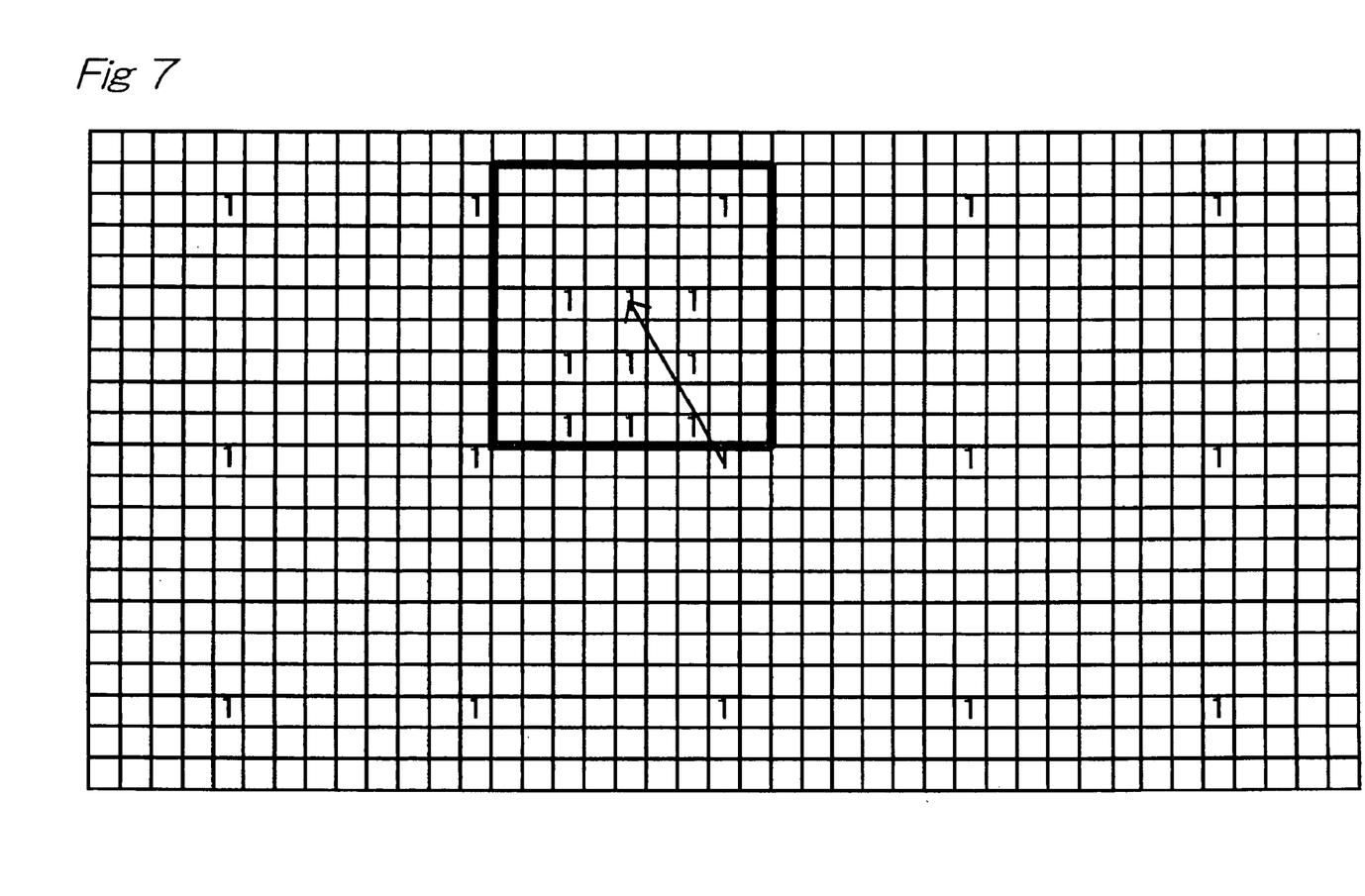
FIG. 7 is a view showing a range which a motion vector re-search part searches.

Then, a re-search of a specified range in which the determined motion vector re-search center point is its center is made for a motion vector (step S106). The specified range is, for example, ±n/2 in the horizontal direction and ±n/2 in the vertical direction (see FIG. 7). Here, the inside of a frame of a thick line in FIG. 7 is the search range. Besides, in this case, there is shown the case where the evaluation value of the motion vector of the narrow range search is better than that of the motion vector of the wide range search.

The motion vector of the block is determined through the above steps.

Incidentally, the order of the object block read and the reference image read may be reversed, or they may be performed simultaneously. Similarly, the order of the wide range motion vector search and the narrow range motion vector search may be reversed, or they may be performed simultaneously.

When a search is made in the above method, in the case where the movement is small, the performance of the narrow range search is employed, and in the case where the movement is large, the performance of the wide range search is employed, and therefore, a desirable motion vector search becomes possible for any movement. Besides, as compared with a case where a search of all search range is made, a search for a motion vector becomes possible with a much smaller processing amount.

(4) Specific Example of the First Motion Vector Detection Method

Figure 11:
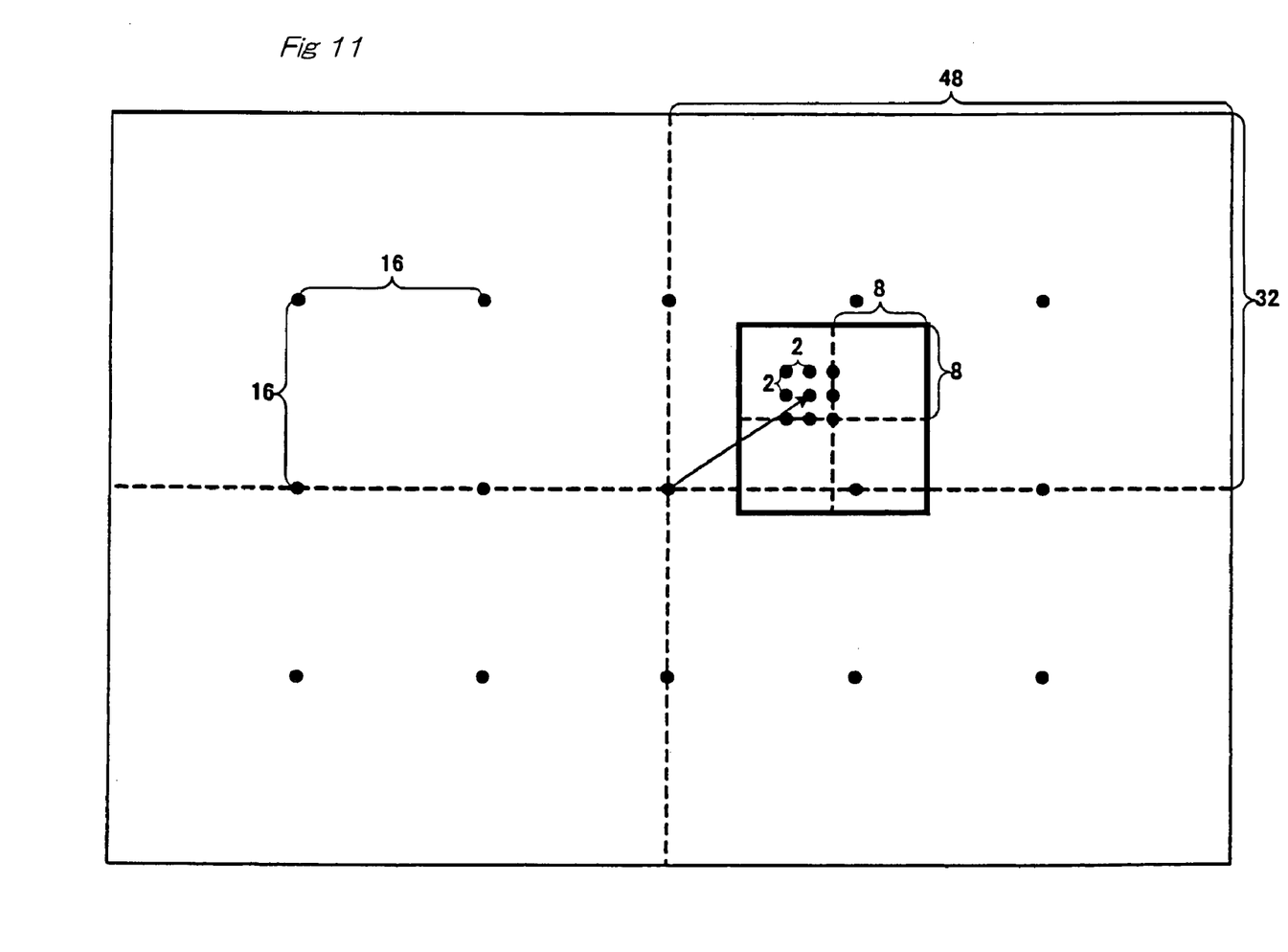
FIG. 11 is a view showing a specific example of a first motion vector detection method.

The first motion vector detection method will be described with reference to FIG. 11, while a case where the motion vector detection is performed on an SD image (screen size: 720 pixels horizontally by 480 pixels vertically) is used as a specific example.

It is sufficient if the search range of the motion vector is approximately ±48 pixels in the horizontal direction and approximately ±32 pixels in the vertical direction. At this time, when the interval in the rough search is made 16 pixels, rough search points are in total 15 points of (0, 0), (0, ±16), (0, ±32), (±16, 0), (±16, ±16) and (±16, ±32).

Besides, in the fine search, the search is made on points of ±2 pixels while the predicted vector obtained from peripheral blocks is made the center. That is, when the predicted vector is (Px, Py), the search is made on in total 9 points of (Px, Py), (Px±2, Py), (Px, Py±2) and (Px±2, Py±2).

A re-search is made for the motion vector while a point having the best evaluation point among all the 21 search points is made the center. The search range at this time is made ±8 pixels in both the horizontal direction and the vertical direction. The search method may be a hierarchical search method or the like. As a result of the re-search, the point having the best evaluation value becomes the motion vector.

(5) Second Motion Vector Detection Method

Figure 8:
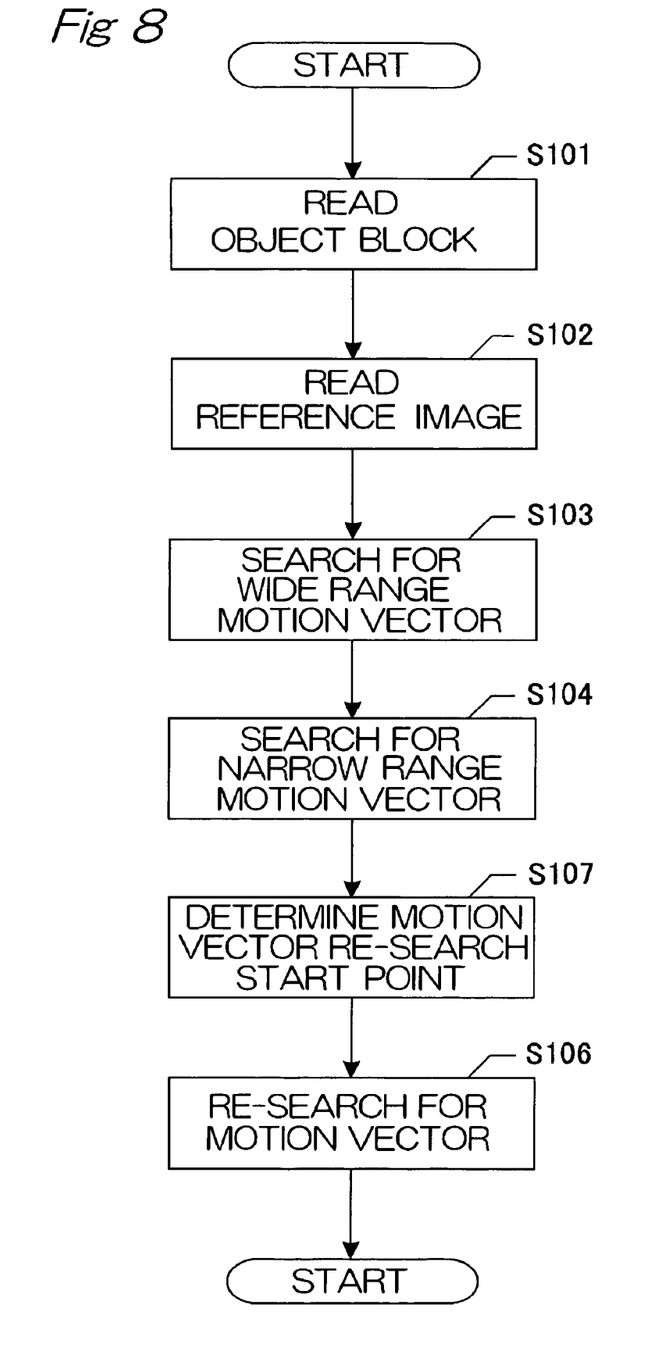
FIG. 8 is a flowchart showing a procedure of a motion vector detection method carried out by the motion vector detection device.

Next, a second motion vector detection method will be described with reference to FIG. 8, while a case in which it is carried out by the motion vector detection device 105 is used as an example.

First, an object block is read from the input image memory 101 (step S101), and a reference image is read from the reference image memory 108 (step S102).

Next, the wide range motion vector search part 201 roughly searches for a motion vector (step S103).

Figure 9:
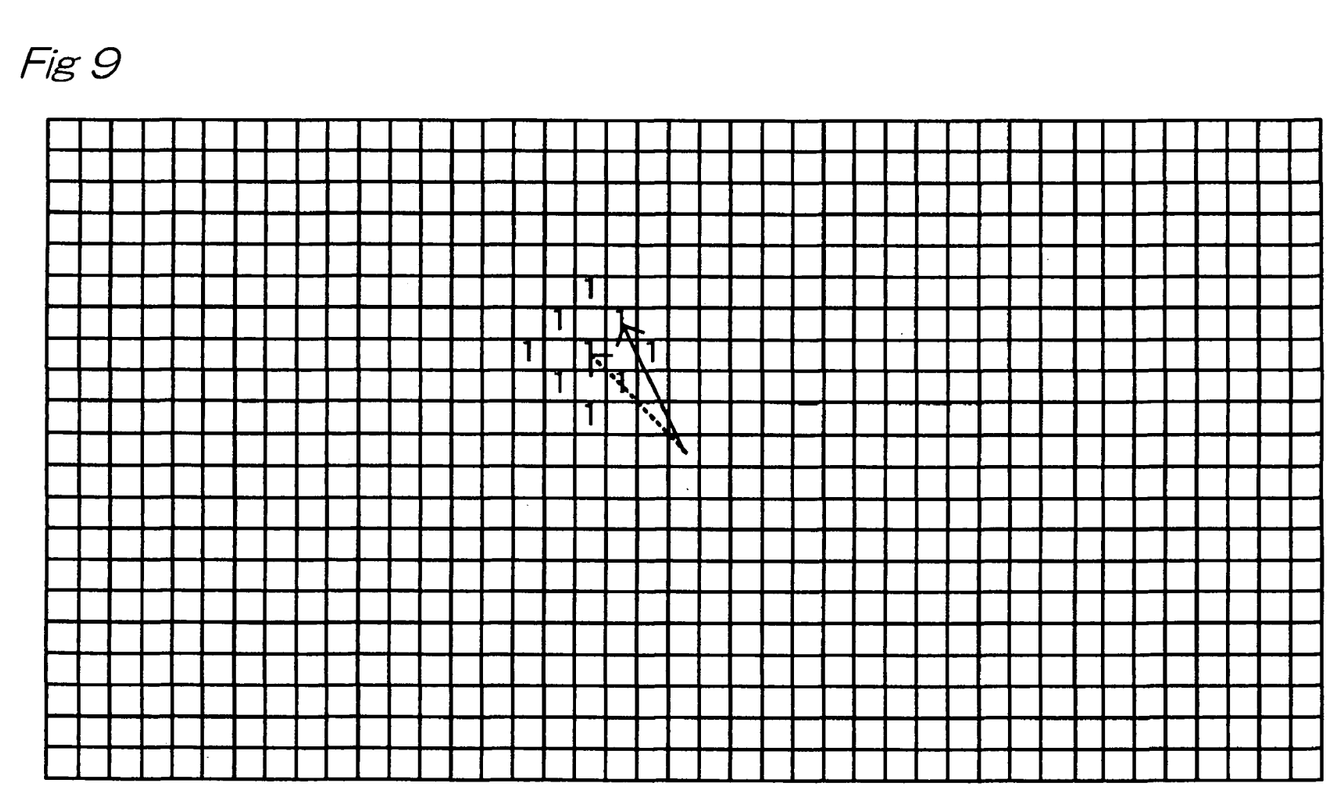
FIG. 9 is a view showing points which the narrow range motion vector search part searches.

Next, the narrow range motion vector search part 202 finely searches the vicinity of a predicted value of the motion vector (step S104). Specifically, the narrow range motion vector search part 202 makes a search on search points of a first step by a specified gradient method (for example, diamond search), while a motion vector (Px, Py) obtained by the motion vector prediction part 203 is made a start point (see FIG. 9). Here, a dotted line of FIG. 9 denotes a predicted motion vector, "1" denotes a search point, and a solid line denotes a detected motion vector.

Next, the motion vector re-search part 204 determines a motion vector re-search start point (step S107). Specifically, evaluation values of two motion vectors obtained by the wide range motion vector search and the narrow range motion vector search are compared and a better one is selected. The evaluation value is, for example, a sum of absolute difference (SAD), a sum of square difference (SSD) or the like. Besides, what is obtained by weight-adding the magnitudes of the motion vectors to these may be adopted.

Figure 10:
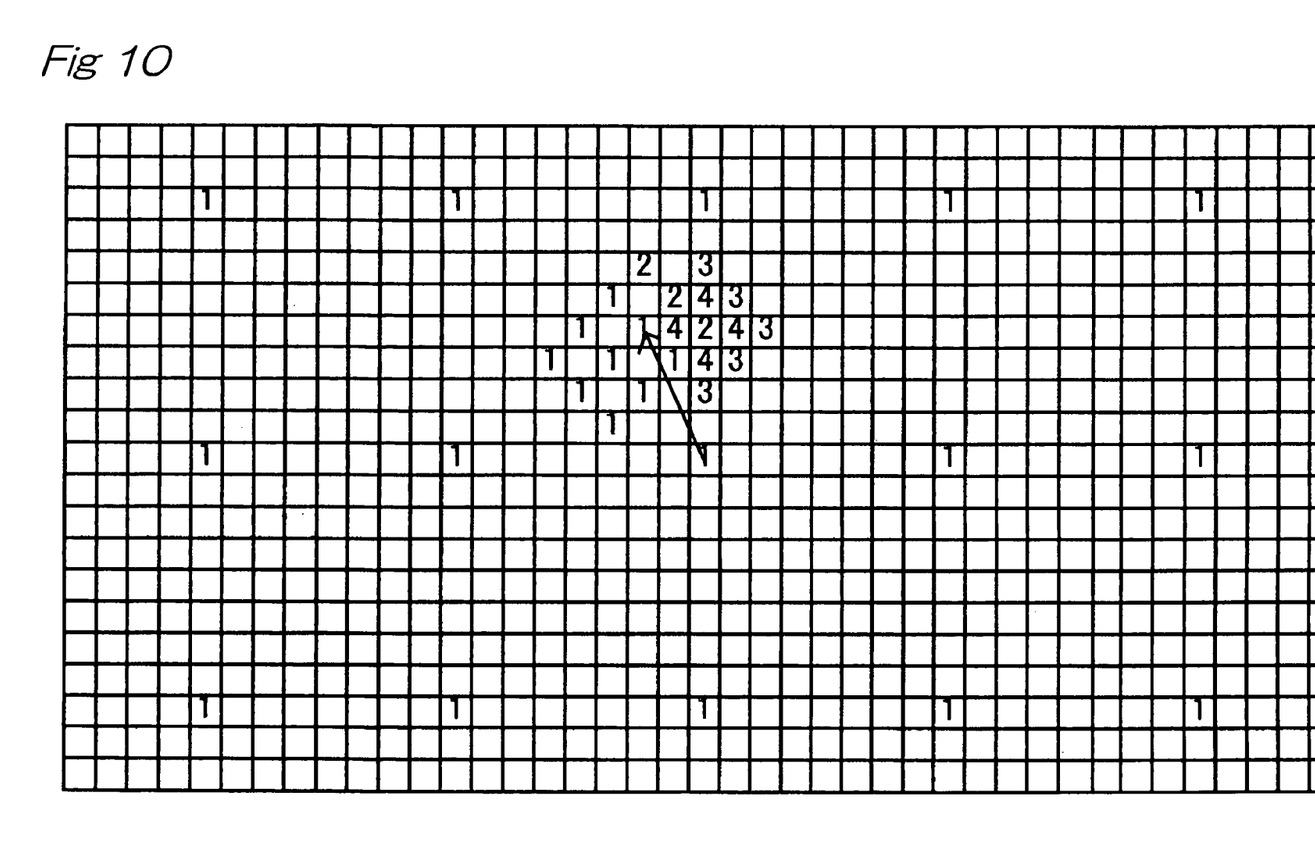
FIG. 10 is a view showing points which the motion vector re-search part searches.

The determined motion vector re-search start point is made a start point, and in accordance with the foregoing specified gradient method, a re-search is made for a motion vector (step S106, see FIG. 10). FIG. 10 shows a case where the evaluation value of the motion vector of the narrow range search is better than that of the motion vector of the wide range search, and the search is made in the order of "2", "3" and "4".

The motion vector of the block is determined through the above steps.

Incidentally, the order of the object block read and the reference image read may be reversed, or they may be performed simultaneously. Similarly, the order of the wide range motion vector search and the narrow range motion vector search may be reversed or they may be performed simultaneously.

When the search is made by the above method, in the case where the movement is small, the performance of the narrow range search is employed, and in the case where the movement is large, the performance of the wide range search is employed, and therefore, a desirable motion vector search becomes possible for any movement. Besides, as compared with the case where a search is made in all search range, a search for a motion vector becomes possible with a much small processing amount.

MODIFIED EXAMPLE

The invention is not limited to the embodiment, but may be variously modified within the scope of its gist.

For example, the motion vector detection processing performed in the embodiment may be performed by a dedicated hardware circuit, or a structure may be made such that a CPU operates in accordance with a program so that the motion vector detection processing (see FIGS. 3 and 8) is performed.

Besides, a program to cause a computer to execute the processing as stated above may be provided to a user through a communication line such as the Internet, or the program is recorded on a computer readable recording medium such as a CD-ROM (Compact Disc-Read Only Memory) and may be provided to a user.

INDUSTRIAL APPLICABILITY

As described above, embodiments consistent with the present invention are useful for a technique to compress a moving image and to perform transmission, recording and the like.

What is claimed is:

1. A motion vector detection method for detecting a motion vector by comparing a detection object image which is one image in a moving picture and is a detection object of the motion vector and a reference image as an image at a time different from the detection object image in the moving picture, the method comprising:
   using a computer to divide the detection object image into plural blocks and to process each divided block,
   wherein the processing of each block includes, obtaining a wide range search evaluation value by searching for a motion vector for the currently processed block at intervals of "n" pixels in a wide search range having "a" pixels and having a wide range search center point which is at a position in the reference image corresponding to a position of the currently processed block in the detection object image;

predicting a predicted motion vector for the currently processed block from past motion vectors for peripheral blocks of the currently processed block, and obtaining a narrow range search evaluation value by searching for the motion vector for the currently processed block at intervals of "m" pixels (n>m>=1) in a narrow search range having "b" pixels (a>b>1) and having a narrow range search center point which is at a position of the predicted motion vector;

comparing the wide range search evaluation value and the narrow range search evaluation value, and determining, from a result of the comparison, a position corresponding to a high search evaluation value to be a re-search center point of the motion vector for the currently processed block; and detecting the motion vector for the currently processed block by re-searching in a re-search range having "c" pixels (a>c>=b) and a center at the re-search center point, wherein "n", "a", "m", "b" and "c" are positive integers.

2. The motion vector detection method according to claim 1, wherein the narrow search range includes only pixels equivalent to a search range of a first stage of a gradient method in which the center is a pixel at a position of the predicted motion vector.

3. The motion vector detection method according to claim 1, wherein, when the re-search is made to detect the motion vector, the re-search is made in accordance with a search format of a gradient method while the re-search center point is made the center.

4. The motion vector detection method according to claim 1, wherein, when the wide range search evaluation value is obtained, the wide search range is a range of at least 20 pixels from the wide range search center point, and the "n" pixels are 16 pixels.

5. The motion vector detection method according to claim 1, wherein when the narrow range search evaluation value is obtained, the narrow search range is a range of 2 pixels from the narrow range search center point, and the "m" pixels are two pixels.

6. The motion vector detection method according to claim 1, wherein when the re-search is made to detect the motion vector, the re-search range is a range of 8 pixels from the re-search center point.

7. The motion vector detection method according to claim 1, wherein the evaluation value used for the motion vector detection is one of a sum of absolute difference (SAD), a sum of square difference (SSD), and a value obtained by weight-adding magnitudes of motion vectors to these.

8. The motion vector detection method according to claim 1, wherein the re-search range is a range of p pixels (n>p) from the re-search center point.

9. A motion vector detection device for detecting a motion vector by comparing a detection object image which is one image in a moving picture and is a detection object of the motion vector and a reference image as an image at a time different from the detection object image in the moving picture, the motion vector detection device comprising:
memory; and
a processor accessing the memory and configured to divide the detection object image into plural blocks, and to detect a motion vector of each of the plural blocks by:

obtaining a wide range search evaluation value by searching for a motion vector for a currently processed block at intervals of "n" pixels in a wide search range having "a" pixels and having a wide range search center point which is at a position in the reference image corresponding to a position of the currently processed block in the detection object image;

predicting a predicted motion vector for the currently processed block from past motion vectors for peripheral blocks of the currently processed block, and obtaining a narrow range search evaluation value by searching for the motion vector for the currently processed block at intervals of "m" pixels (n>m>=1) in a narrow search range having "b" pixels (a>b>1) and having a narrow range search center point which is at a position of the predicted motion vector;

comparing the wide range search evaluation value and the narrow range search evaluation value, and determining, from a result of the comparison, a position corresponding to a high search evaluation value to be a re-search center point of the motion vector for the currently processed block; and detecting the motion vector for the currently processed block by re-searching in a re-search range having "c" pixels (a>c>=b) and a center at the re-search center point, wherein "n", "a", "m", "b" and "c" are positive integers.

10. A non-transitory computer readable medium comprising instructions, for causing a computer to perform steps for detecting a motion vector by comparing a detection object image which is one image in a moving picture and is a detection object of the motion vector and a reference image as an image at a time different from the detection object image in the moving picture, the steps comprising:

dividing the detection object image into plural blocks; and
with respect to each of the plural blocks, obtaining a wide range search evaluation value by searching for the motion vector for the currently processed block at intervals of "n" pixels in a wide search range having "a" pixels and having a wide range search center point which is at a position in the reference image corresponding to a position of the currently processed block in the detection object image;

predicting a predicted motion vector for the currently processed block from past motion vectors for peripheral blocks of the currently processed block, and obtaining a narrow range search evaluation value by searching for the motion vector for the currently processed block at intervals of "m" pixels (n>m>=1) in a narrow search range having "b" pixels (a>b>1) and having a narrow range search center point which is at a position of the predicted motion vector;

comparing the wide range search evaluation value and the narrow range search evaluation value, and determining, from a result of the comparison, a position corresponding to a high search evaluation value to be a re-search center point of the motion vector for the currently processed block; and detecting the motion vector for the currently processed block by re-searching in a re-search range having "c" pixels (a>c>=b) and a center at the re-search center point, wherein "n", "a", "m", "b" and "c" are positive integers.

* * * * *